United States Patent [19]
Virnig et al.

[11] Patent Number: 6,156,280
[45] Date of Patent: Dec. 5, 2000

[54] PROCESS FOR REMOVING MANGANESE FROM ORGANIC SOLUTIONS OF OXIMES AND NICKEL ORE TREATMENT PROCESS

[75] Inventors: Michael J. Virnig; Stephen M. Olafson; Burrel Boley, III, all of Tucson, Ariz.

[73] Assignee: Henkel Corporation, Gulph Mills, Pa.

[21] Appl. No.: 09/257,147

[22] Filed: Feb. 24, 1999

[51] Int. Cl.[7] ............................ C22B 47/00; C22B 23/00; B01D 11/00; C25C 1/06
[52] U.S. Cl. ............................ 423/49; 423/139; 423/140; 423/150.1; 75/724; 205/589
[58] Field of Search .............................. 423/49, 139, 140, 423/150.1; 75/724; 205/589

[56] References Cited

U.S. PATENT DOCUMENTS

| | | | |
|---|---|---|---|
| 2,245,217 | 6/1941 | Mowlds . | |
| 3,224,873 | 12/1965 | Swanson | 75/101 |
| 3,428,449 | 2/1969 | Swanson | 75/117 |
| 3,952,775 | 4/1976 | Ogata | 137/625.38 |
| 4,020,105 | 4/1977 | Ackerley et al. | 260/566 |
| 4,020,106 | 4/1977 | Ackerley et al. | 260/566 |
| 4,029,704 | 6/1977 | Anderson | 260/566 |
| 4,085,146 | 4/1978 | Beswick | 260/600 |
| 4,173,616 | 11/1979 | Koenders et al. | 423/24 |
| 4,507,268 | 3/1985 | Kordosky et al. | 423/24 |
| 4,544,532 | 10/1985 | Kordosky et al. | 423/24 |
| 4,582,689 | 4/1986 | Kordosky | 423/24 |

FOREIGN PATENT DOCUMENTS

| 1322532 | 7/1973 | United Kingdom . |
|---|---|---|

*Primary Examiner*—Steven Bos
*Attorney, Agent, or Firm*—John E. Drach; Henry E. Millson, Jr.

[57] ABSTRACT

Process for removing manganese values from a solution of a water-immiscible hydrocarbon containing manganese values and a water-insoluble oxime extractant capable of extracting nickel values from aqueous ammoniacal solutions comprising the steps of I) contacting the water-immiscible hydrocarbon solution with a finely divided active metal and an aqueous solution of a strong acid to decrease or complete remove the manganese values from said water-immiscible hydrocarbon solution; and II) separating the stripped hydrocarbon solution from the aqueous solution.

The invention also relates to a method for the extraction of nickel from nickel-containing ores in which a content of manganese values is present in which the above process is used.

32 Claims, No Drawings

PROCESS FOR REMOVING MANGANESE FROM ORGANIC SOLUTIONS OF OXIMES AND NICKEL ORE TREATMENT PROCESS

FIELD OF THE INVENTION

This invention relates to the recovery of metals from metal ores.

STATEMENT OF RELATED ART

The extraction of metals, e.g. nickel, from metal ores in which acid leach solutions are obtained from the treatment of the ores with an acid such as sulfuric acid is known.

However, processes for extracting the desired metal values from such leach solutions have presented problems which have proven to be difficult to solve in an economical manner.

For example, the separation of manganese from nickel in the leach solutions has proven to be expensive and only partially successful in terms of the overall process.

SUMMARY OF THE INVENTION

A process has now been discovered in which manganese can be removed successfully and relatively inexpensively from organic solutions used to obtain the nickel values during the processing of the acid leach solutions.

The present process is carried out as follows:

(a) leaching a nickel-containing ore, e.g. a nickel laterite ore, with an acid to provide an aqueous acid leach solution containing nickel values along with other metal values including manganese values;

(b) adding a hydroxide or hydroxide precursor to the aqueous acid leach solution to precipitate the nickel as nickel hydroxide;

(c) re-leaching the nickel hydroxide with an aqueous ammoniacal solution to provide an aqueous ammoniacal solution containing metal values including the nickel values;

(d) contacting the aqueous ammoniacal solution containing the metal values with a water insoluble oxime extractant, capable of extracting nickel from said aqueous ammoniacal solution, comprising an oxime extractant dissolved in a water-immiscible hydrocarbon solvent so as to provide an organic phase, for a time sufficient to extract the nickel values from said aqueous ammoniacal solution containing the nickel values thereby providing an aqueous phase of the ammoniacal solution from which nickel values have been removed and a water-immiscible organic phase containing the extracted nickel values and at least some of the manganese values;

(e) separating the aqueous and the organic phases;

(f) contacting the organic phase containing the nickel values and manganese value with an aqueous acid solution thereby stripping the nickel values from the organic phase into the aqueous acid stripping solution;

(g) separating the aqueous acid stripping solution now containing the nickel values from the water-immiscible organic phase which contains most of the manganese values;

(h) electrowinning the nickel from the aqueous acid stripping solution to remove and recover the nickel; and either before or after step (h), (i) contacting the water-immiscible organic phase which contains manganese values which were not removed by the aqueous acid stripping solution in step (f) with an active metal in finely divided form together with an aqueous solution of a strong acid to decrease or completely remove the manganese values from the organic phase; and (j) separating the stripped organic phase from the aqueous acid phase.

DETAILED DESCRIPTION OF THE INVENTION

Other than in the operating examples, or where otherwise indicated, all numbers expressing quantities of ingredients or reaction conditions used herein are to be understood as modified in all instances by the term "about".

In the above process, under typical acid stripping conditions, manganese which is present in nickel ores and is therefore also present in the organic extractant solution, is not stripped from the organic extractant solution in step (f) and in fact cannot be stripped even with typical acid concentrations of from 100–250 g/L sulfuric acid, and builds up therein upon recycling of the organic extractant solution until all of the available metal loading capacity is consumed by the manganese build-up.

In step (i) above, the active metal is preferably zinc, but cobalt, iron, copper, and nickel metals can also be used. Obviously, a mixture of two or more of such metals can be employed.

The metal is used in finely divided form and preferably in a water-wetted form. Particle sizes from a fine powder to +100 mesh can be employed herein, preferably from −325 mesh (0.045–0.060 mm diameter) to +400 mesh.

The strong acid used in step (i) is preferably aqueous sulfuric acid, although other strong acids can also be employed, such as hydrochloric and phosphoric acids. Aqueous solutions of the above strong acids, containing from 50–500 gpl, preferably from 150–200 gpl can be used herein.

Step (i) can be carried out at a temperature in the range of from ambient to 75° C., preferably from 40 to 60° C.

The quantity of aqueous acid relative to the water-immiscible organic phase is not critical, although a volume/volume ratio of (0.5 to 2.0):1, preferably about 1:1 aqueous acid: organic phase is advantageously employed.

The quantity of finely divided active metal to manganese values in the organic phase can range from 1 to 25 grams, preferably from 2 to 15 grams, and more preferably from 5 to 10 grams of active metal per gram of manganese.

In step (a) above the nickel ore is first leached with an acid leach and the solids separated from the liquid leach solution. The acid leach can be carried out with an acid such as sulfuric acid or $Fe_2(SO_4)_3$ which disproportionates into $Fe_2O_3$ and $H_2SO_4$.

Step (b) is carried out at a pH in the range of from about 6.0 to 9.0 using a hydroxide such as $Ca(OH)_2$, $Mn(OH)_2$, and the like, or a basic compound that forms a hydroxide in aqueous solution, such as MgO and CaO, to precipitate nickel hydroxide.

Step (c) is carried out with an aqueous ammoniacal solution such as an aqueous ammoniacal carbonate at ambient pressure to dissolve the nickel values. This solution preferably contains less than about 100 g/L ammonia, more preferably less than 70 g/L, and most preferably less than 40 g/L ammonia.

In step (d) the aqueous ammoniacal solution is contacted with a water-immiscible oxime extractant dissolved in a water-immiscible liquid hydrocarbon solvent to extract the nickel values. The water-immiscible oxime extractants have the formula:

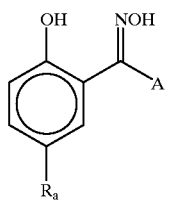

in which A may be:

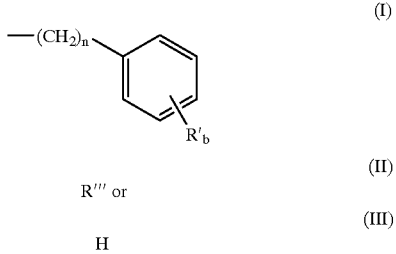

R''' or (II)

H (III)

where R and R' can be the same or different, and are saturated aliphatic groups of 1–25 carbon atoms, ethylenically unsaturated aliphatic groups of 3–25 carbon atoms of OR" where R" is a saturated or ethylenically unsaturated aliphatic group as defined above; n is 0 or 1; a and b are each 0, 1, 2, 3, or 4, with the proviso that both are not 0 and the total number of carbon atoms in $R_a$ plus $R'_b$ is from 3 to 25, R''' is a saturated aliphatic group of 1–25 carbon atoms or an ethylenically unsaturated aliphatic group of 3 to 25 carbon atoms, with the proviso that the total number of carbon atoms in $R_a$ plus R''' is from 3–25. Preferred compounds where A is (I) above are those in which a is 1, b is 0, R is a straight or branched chain alkyl group having from 7 to 12 carbon atoms and where R is attached in a position para to the hydroxyl group. Preferred compounds in which A is II above are those wherein R''' is methyl and R and a are as designated for the preferred compounds where A is I. Compounds wherein n has a value of 0 (i.e. hydroxybenzophenone oxime compounds) may suitably be prepared according to methods disclosed in Swanson U.S. Pat. Nos. 3,952,775 and 3,428,449. By reason of ready solubility in organic diluents commonly employed in solvent extraction and desirable properties of complexes of the compounds with nickel, preferred benzophenone compounds are those having a single alkyl group of 7–12 carbon atoms in a position para to the hydroxyl group, in which the alkyl group is a mixture of isomers. Examples of such compounds are 2-hydroxy-5-nonyl benzophenone oxime and 2-hydroxy-5-dodecyl benzophenone oxime, which are obtained as mixtures of the isomeric forms when commercial nonylphenol and dodecylphenol are respectively employed in their synthesis.

Compounds wherein n has a value of 1 (i.e. hydroxy phenyl benzyl ketone oxime compounds) may suitably be prepared according to methods described in Anderson U.S. Pat. No. 4,029,704. Preferred phenyl benzyl ketone oximes like the above noted benzophenone oximes are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of the hydroxy phenyl alkyl ketone oxime type may suitably be prepared according to the procedures disclosed in UK Patent 1,322,532. As noted with regard to the benzophenone and phenyl benzyl ketone compounds noted above, the preferred compounds of this type are also those having an isomeric mixture of 7 to 12 carbon alkyl groups as a single substituent on the ring para to the hydroxyl group. Also preferred are those in which the R''' alkyl group is methyl. Illustrative of preferred compounds where A is methyl is 2-hydroxy-5-nonyl phenyl methyl ketone oxime manufactured through the use of commercial nonylphenol.

Hydroxy aryl aldoxime extractants which are employed are those in which A is H. These hydroxy benzaldoximes, also called "salicylaldoximes", may suitably be prepared according to methods described in Ackerley et al. U.S. Pat. Nos. 4,020,105 or 4,020,106 or by oximation of aldehydes prepared according to Beswick U.S. Pat. No. 4,085,146. Again, preferred compounds are those having an isomeric mixture of isomeric 7 to 12 carbon alkyl groups as a single substituent para to the hydroxyl group. Mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are preferred. The most preferred compounds for the purposes of the present invention where A is H are the nonyl and dodecyl compounds.

The extractants may include a single extractant chemical as illustrated above or may comprise mixtures of different aldoxime or ketoxime extractants of the type set forth in U.S. Pat. Nos. 4,507,268, 4,544,532 and 4,582,689.

The most preferred extractants are ketoximes prepared by the process of copending application Ser. No. 09/257532, filed Feb. 2, 1999, the entire contents of which are incorporated herein by reference, which can be used alone or in combination with an aldoxime described above.

As indicated above, the oxime reagent which is water insoluble is dissolved in a water-immiscible liquid hydrocarbon solvent and the resulting organic solution is contacted with the nickel containing aqueous phase to extract at least a portion of the nickel values into the organic phase. The phases are then separated (step (e)) and the nickel values are stripped from the loaded organic (LO) phase by use of an aqueous acid stripping medium. Prior to stripping, it is not unusual to wash the organic phase, particularly where trace metals may be loaded on the organic extractant. One or more wash stages may accordingly be employed depending on any trace metals present, the amount of entrainment and the required purity of the final nickel loaded stripping solution.

In the process of extraction in step (d) a wide variety of water-immiscible liquid hydrocarbon solvents can be used in the copper recovery process to form the organic phase in which the diketone extractant is dissolved. These include aliphatic and aromatic hydrocarbons such as kerosene, benzene, toluene, xylene and the like. A choice of essentially water-immiscible hydrocarbon solvents or mixtures thereof will depend on various factors, including the plant design of the solvent extraction plant, (mixer-settler units, extractors) and the like. The preferred solvents for use in the present invention are the aliphatic or aromatic hydrocarbons having flash points of 130° Fahrenheit and higher, preferably at least 150° and solubilities in water of less than 0.1% by weight. The solvents are essentially chemically inert. Representative commercially available solvents are Chevron™ ion exchange solvent (available from Standard Oil of California) having a flash point of 195° Fahrenheit; Escaid™ 100 and 110 (available from Exxon-Europe) having a flash point of 180° Fahrenheit; Norpar™ 12 (available from Exxon-USA) with a flash point of 160° Fahrenheit; Conoco™ C1214 (available from Conoco) with a flash point of 160° Fahrenheit; and Aromatic 150 (an aromatic kerosene available from Exxon-USA having a flash point of 150° Fahrenheit), and various other kerosene and petroleum fractions available from other oil companies.

In step (d), the volume ratios of organic to aqueous (O:A) phase will vary widely since the contacting of any quantity of the oxime organic solution with the nickel containing aqueous ammoniacal solution will result in the extraction of nickel values into the organic phase. For commercial practicality however, the organic:aqueous phase ratios for extraction are preferably in the range of about 50:1 to 1:50. It is desirable to maintain an effective O:A ratio of about 1:1 in the mixer unit by recycle of one of the streams. In the stripping step, the organic:aqueous stripping medium phase will preferably be in the range of about 1:4 to 20:1. For practical purposes, the extracting and stripping are normally conducted at ambient temperatures although higher and lower temperatures and pressures are entirely operable. It is preferable to strip at elevated temperatures. While the entire operation can be carried out as a batch operation, most advantageously the process is carried out continuously with the various streams or solutions being recycled to the various operations in the process of recovery of the nickel, including the leaching, extraction and the stripping steps.

In the extraction process of step (d), the organic solvent solutions may contain the oxime extractant typically in an amount of about 20–30% by weight, generally on a VolumeNolume percentage (V/V %) with respect to the solvent of about 10–40 V/V %, typically about 30–35 V/V %.

In step (d), modifiers of extraction and stripping equilibria, generally described as "equilibrium modifiers" are usually incorporated in reagent formulations to shift equilibria in a manner facilitating stripping and to enhance overall extraction efficiency. A wide variety of modifiers have been proposed for use in the formulation of solvent extraction reagents, and the use thereof is not precluded in the present invention, where desirable. Proposed modifiers have included long chain ($C_6$ to $C_{20}$) aliphatic alcohols such as isodecanol, tridecanol, and 2-ethylhexanol; and long chain (6–20) alkyl phenols such as nonylphenol. The most frequently employed modifiers include nonylphenol and tridecanol.

Ammonia antagonist compounds can also optionally be present in the organic phase in step (d) and which may also function as an equilibrium modifier. Such ammonia antagonist compounds act to provide an efficient net transfer of the nickel values in the overall extraction process. Use of ammonia antagonist compounds results in a significant reduction in the chemically bonded ammonia in the organic phase, thereby providing reduced cost of operation, minimizing, if not eliminating, the scrubbing of the organic phase with a weakly acidic solution. Thus, the ammonia antagonist is employed in an amount effective to provide a significant reduction in the ammonia in the organic phase when employed with the present ketoxime or ketoxime/aldoxime extractant. The ammonia antagonist is a compound which may be characterized as a pure hydrogen bond acceptor compound. By "pure hydrogen bond acceptor" is meant that the compound is "only" a hydrogen bond acceptor compound in contrast to compounds which are hydrogen bond donors or a mixed hydrogen bond donor and acceptor. Mixed hydrogen bond donor and acceptor compounds can be illustrated by alkyl phenol, such as nonyl phenol or alcohols such as tridecanol, each of which is a mixed hydrogen bond donor and acceptor. While the ammonia antagonist is useful with ketoxime/aldoxime and aldoxime strong extractants, in that they may also act as an equilibrium modifier to provide efficient net transfer, the ammonia antagonist is also useful with the weaker oxime extractant, such as the ketoxime extractant used alone, in that a very significant reduction in ammonia transfer to the organic phase occurs, though equilibrium modifier properties may not be necessary in the case of the ketoxime extractants. Thus, in the improved process of the present invention, there can be employed ammonia antagonist compounds which are "non-hydrogen bond donating" and are only "hydrogen bond accepting" compounds.

It is found that the use of an ammonia antagonist, which is only a hydrogen bond acceptor modifier, such as 2,2,4-trimethylpentane-1,3-diol diisobutyrate, surprisingly resulted in about a 50% reduction in the amount of ammonia transferred relative to the nickel.

The ammonia antagonists for use in the present nickel extraction process are those organic hydrogen bond acceptor compounds containing one or more of the following organic functionalities: esters, ketone, sulfoxide, sulfone, ether, amine oxide, tertiary amide, phosphate, carbonate, carbamate, urea, phosphine oxide, and nitrile and having greater than 8 carbon atoms, up to about 36 carbon atoms and a water solubility of less than 100 ppm, more desirably less than 50 ppm and preferably less than 20 ppm. Other than 2,2,4-trimethylpentane-1,3-diol diisobutyrate, which is preferred, illustrative ammonia antagonists which are only hydrogen bond acceptor compounds are: alkyl esters and dialkyl ketones in which the alkyl groups contain from 4 to about 12 carbon atoms, such as isobutyl isooctanoate and isobutyl heptyl ketone and the dinitrile of dimerized fatty acids such as dimerized $C_{18}$ fatty acids, (Dimer Acid™ dinitrile).

Kinetic additive substances may also optionally be present in the organic phase in amounts ranging from 0 to 20 mole percent based on ketoxime content and preferably from 0 to 5 mole percent. If present at all, as little as 0.01 mole percent may be used. Preferred kinetic additives include α-hydroxy oximes described in Swanson, U.S. Pat. No. 3,224,873 and α,β-dioximes described in Koenders et al., U.S. Pat. No. 4,173,616. The above patents are incorporated herein by reference. A preferred α-hydroxy oxime kinetic additive is 5,8-diethyl-7-hydroxydodecan-6-oxime and a preferred dioxime kinetic additive is a mixture of 1-(4'-alkylphenyl)-1,2-propanedione dioximes according to Example 3 of U.S. Pat. No. 4,173,616.

Step (f) is carried out using a highly acidic aqueous acid. The concentration of the aqueous acid is somewhat dependent on the oxime extractant or extractants selected, and can be readily determined for any particular extractant or extractants. When aqueous sulfuric acid is used, the solution generally contains from 5 g/L sulfuric acid up to 200 g/L or more.

The acid levels required to strip acetophenone oxime, for example, are relatively low. A single or preferably, a multi-stage stripping step can be employed. The latter makes it possible to produce a strong nickel electrolyte solution suitable for electrowinning, rendering the strip aspects of the process quite practical.

The invention will be illustrated but not limited by the following examples and comparative examples.

EXAMPLES

Example 1

A 1 g/L $Mn^{2+}$, 32.5 g/L $NH_3$ aqueous solution was prepared by dissolving 3 g of $MnSO_4 \cdot H_2O$ in 112 g of 29 V/V percent $NH_3$ and deionized water for a total solution of 1 L. An extractant solution was prepared by dissolving 2-hydroxy-5-nonyl acetophenone oxime in Conoco 170 Exempt hydrocarbon solvent (30 V/V percent solutions). The above aqueous solution was contacted with the 30 V/V percent hydrocarbon extractant at an O/A=1/1 for one hour. The hydrocarbon extractant was separated from the aqueous solution and analyzed for Mn. The hydrocarbon extractant was then diluted to 500 ppm Mn using fresh 30 V/V percent hydrocarbon extractant, and the Mn concentration was checked by reanalyzing the solution. The hydrocarbon extractant and a 200 g/L $H_2SO_4$ aqueous solution were preheated separately to 60° C. and then mixed together with 2.5 grams of purified Zn powder in a jacketed, baffled 1 L beaker at 60°C. with a propeller speed of 1500 rpm.

Emulsion samples were removed at various times and filtered using phase separation paper. The hydrocarbon extractant was analyzed for Mn. The results obtained are given in Table 1 below.

TABLE 1

| Time | 0 | 2 | 5 | 10 | 15 | 30 | 60 |
|---|---|---|---|---|---|---|---|
| Mn(ppm) | 492 | 474 | 469 | 458 | 444 | 424 | 387 |

Example 2

The process of Example 1 was repeated except that 5 grams of purified Zn powder was used instead of 2.5 grams. The results obtained are given in Table 2 below:

TABLE 2

| Time | 0 | 2 | 5 | 10 | 15 | 30 | 60 |
|---|---|---|---|---|---|---|---|
| Mn(ppm) | 492 | 414 | 70 | 4 | 1 | 0 | 0 |

Example 3

The process of Example 1 was repeated except that 10 grams of purified Zn powder was used instead of 2.5 grams. The results obtained are given in Table 3 below.

TABLE 3

| Time | 0 | 2 | 5 | 10 | 15 | 30 | 60 |
|---|---|---|---|---|---|---|---|
| Mn(ppm) | 492 | 117 | 12 | 1 | 0 | 0 | 0 |

Example 4

The process of Example 1 was repeated except that 5 grams of reduced Fe powder was used instead of 2.5 grams of purified Zn powder. The results are given in Table 4 below.

TABLE 4

| Time | 0 | 2 | 5 | 10 | 15 | 30 | 60 |
|---|---|---|---|---|---|---|---|
| Mn(ppm) | 492 | 475 | 458 | 435 | 405 | 360 | 317 |

Example 5

The process of Example 1 was repeated except that 1.5 grams of purified Zn powder was used instead of 2.5 grams. The results obtained are given in Table 5 below.

TABLE 5

| Time | 0 | 2 | 5 | 10 | 15 | 30 | 60 |
|---|---|---|---|---|---|---|---|
| Mn(ppm) | 492 | 481 | 475 | 475 | 468 | 455 | 432 |

Example 6

A 30 V/V % solution of 2-hydroxy-5-nonyl acetophenone oxime dissolved in Conoco 170 Exempt hydrocarbon diluent (the extraction solution) was mixed with an aqueous ammoniacal solution containing 1.0 g/l Mn, 32.5 g/l $NH_3$ and 25 g/l $(NH_4)_2SO_4$. The ammoniacal manganese solution was prepared by adding 3.0 grams of manganese sulphate monohydrate to DI water. When the manganese sulphate dissolved, 112 grams of 29 percent ammonium hydroxide and 25 g/l ammonium sulphate were added to the solution with additional DI water to generate a 1.0 g/l manganese solution. When solution clarity occurred, the 1.0 g/l manganese solution was contacted in a baffled container with one liter of the extractant solution. After one hour of contact time using a mixing impeller, the emulsion was placed in a separatory funnel, the aqueous phase was drawn off and discarded and the organic phase (extractant solution) filtered through IPS filter paper. The manganese loaded extractant solution was diluted to 0.495 g/l Mn by the addition of fresh extractant solution.

400 mls. of the diluted extractant solution was placed in a heated (60° C.) jacketed and baffled one liter beaker. A (60° C.) aqueous solution containing of 200 g/l sulfuric acid was added to the heated extractant solution to generate an O/A ratio of 1/1. Ten milliliter organic/aqueous samples were taken and analyzed for manganese at 15, 30 and 60 minutes. Essentially no manganese was extracted by the acid stripping. After 60 minutes of acid washing, 1.25 grams of cobalt powder was added to the aqueous continuous emulsion. Ten milliliter samples were taken at 2, 5, 10, 15, 30 and 60 minutes. The emulsions were placed in 60 milliliter separatory funnels, filtered and the aqueous and organic samples were analyzed for manganese. The results are set forth in Table 6 below.

TABLE 6

| Conditions | Extractant Solution | 0.495 g/l Mn |
|---|---|---|
| | Cobalt Powder Added | 1.25 grams |
| | Sulfuric Acid Concentration | 200 g/l |
| | Bath Temperature | 60° C. |
| | Acid Wash | 1.0 hour |
| | Cobalt Powder Addition | 1.0 hour |
| | Sample Volume | 10 mls |
| | O/A Ratio | 1/1 |

| Time - Minutes | Mn Extractant Solution Assay G/L | Mn Aqueous Assay G/L | Materials Balance G/L |
|---|---|---|---|
| Acid Wash | | | |
| 15.0 | 0.443–0.444 | 0.043–0.044 | 0.488 |
| 30.0 | 0.440–0.444 | 0.047–0.047 | 0.491 |
| 60.0 | 0.441–0.443 | 0.051–0.052 | 0.495 |
| Cobalt Powder Addition | | | |
| 2.0 | 0.428–0.428 | 0.057–0.057 | 0.485 |
| 5.0 | 0.419–0.419 | 0.063–0.064 | 0.483 |
| 10.0 | 0.402–0.406 | 0.080–0.082 | 0.488 |
| 15.0 | 0.388–0.386 | 0.094–0.094 | 0.483 |
| 30.0 | 0.365–0.367 | 0.149–0.148 | 0.513 |
| 60.0 | 0.251–0.252 | 0.234–0.239 | 0.491 |

Example 7

The process of Example 6 was repeated except that 5.0 grams of powdered cobalt was used instead of 1.25 grams, the cobalt was water wetted before being added to the aqueous continuous emulsion, and no acid washing was used. The results obtained are set forth in Table 7 below.

TABLE 7

| Conditions | Extractant Solution | 0.495 g/l Mn |
| --- | --- | --- |
| | Sulfuric Acid Concentration | 200 g/l |
| | Cobalt Added | 5.0 grams |
| | Bath Temperature | 50–60° C. |
| | Acid Wash | None |
| | Cobalt Powder Addition | 1.0 hour |
| | Sample Volume | 10 mls |
| | O/A Ratio | 1/1 |

| Time - Minutes | Mn Extractant Solution Assay G/L | Mn Aqueous Assay G/L | Materials Balance G/L |
| --- | --- | --- | --- |
| 2 | 0.440–0.442 | 0.049–0.046 | 0.491 |
| 5 | 0.432–0.432 | 0.055–0.054 | 0.487 |
| 10 | 0.405–0.409 | 0.074–0.075 | 0.484 |
| 15 | 0.372–0.375 | 0.119–0.119 | 0.494 |
| 30 | 0.290–0.293 | 0.210–0.214 | 0.500 |
| 60 | 0.221–0.223 | 0.272–0.275 | 0.498 |

Comparative Example 1

The process of Example 1 was repeated except that 5 grams of 40 mesh granular Zn was used instead of 2.5 grams of purified Zn powder. The results obtained are given in Table 8 below.

TABLE 8

| Time | 0 | 10 | 20 | 30 | 45 | 60 | 90 | 100 | 110 | 120 | 135 |
| --- | --- | --- | --- | --- | --- | --- | --- | --- | --- | --- | --- |
| Mn (ppm) | 504 | 503 | 500 | 501 | 499 | 497 | 496 | 492 | 492 | 488 | 488 |

Comparative Example 2

The process of Example 1 was repeated except that 5 grams of 40 mesh degreased Fe filings were used instead of 2.5 grams of purified Zn powder. The results are set forth in Table 9 below.

TABLE 9

| Time | 0 | 10 | 20 | 30 | 45 | 60 | 90 | 100 | 110 | 120 | 135 |
| --- | --- | --- | --- | --- | --- | --- | --- | --- | --- | --- | --- |
| Mn (ppm) | 471 | 449 | 425 | 404 | 382 | 370 | 359 | 336 | 311 | 293 | 275 |

Comparative Example 3

The process of Example 1 was repeated except that no metal was added. The results are set forth in Table 10 below.

TABLE 10

| Time | 0 | 2 | 5 | 10 | 15 | 30 | 60 |
| --- | --- | --- | --- | --- | --- | --- | --- |
| Mn(ppm) | 492 | 487 | 485 | 483 | 481 | 479 | 469 |

What is claimed is:

1. A process for removing manganese values from a solution of a water-immiscible hydrocarbon containing manganese values and a water-immiscible oxime extractant capable of extracting nickel values from aqueous ammoniacal solutions comprising the steps of
   I) mixing the water-immiscible hydrocarbon solution with a finely divided active metal and an aqueous solution of a strong acid to decrease or completely remove the manganese values from said water-immiscible hydrocarbon solution; and
   II) separating the resulting manganese depleted water-immiscible hydrocarbon solution from the aqueous solution of a strong acid.

2. The process of claim 1 wherein the finely divided active metal is finely divided zinc metal.

3. The process of claim 1 wherein the finely divided active metal is selected from the group consisting of zinc, cobalt, iron, copper, and nickel metals.

4. The process of claim 1 wherein the finely divided active metal has a particle size in the range of from about −325 mesh to about +100 mesh.

5. The process of claim 4 wherein the particle size is in the range of from −325 mesh to +400 mesh.

6. The process of claim 1 wherein the strong acid is sulfuric acid.

7. The process of claim 1 wherein the aqueous solution of a strong acid contains from about 50 to about 500 grams of acid per liter.

8. The process of claim 7 wherein the aqueous solution contains from about 150 to about 200 grams per liter of acid.

9. The process of claim 1 wherein step I) is carried out at a temperature of from ambient to about 75° C.

10. The process of claim 9 wherein the temperature is from about 40 to about 60° C.

11. The process of claim 1 wherein the quantity of active metal to manganese values in the water-immiscible hydrocarbon solution is from about 1 to about 25 grams of active metal per gram of manganese.

12. The process of claim 11 wherein the quantity of active metal to manganese values is from about 2 to about 15 grams of active metal per gram of manganese.

13. The process of claim 1 wherein the volume/volume ratio of aqueous acid to hydrocarbon solution is from about (0.5 to 2.0):1.

14. The process of claim 1 wherein the finely divided active metal is finely divided zinc metal having a particle size of from about −325 mesh to about +100 mesh; the strong acid is sulfuric acid in a concentration of from about 50 to about 500 grams of acid per liter; and step I) is carried out at a temperature of from ambient to about 75° C.

15. The process of claim 14 wherein the zinc metal has a particle size of from about −325 mesh to about +400 mesh; the concentration of the sulfuric acid is from about 150 to about 200 grams of acid per liter; and step I) is carried out at a temperature of from about 40 to about 60° C.

16. A process for the extraction of nickel from nickel-containing ores that also contain manganese values comprising the steps of:
   (a) leaching the nickel-containing ore with an acid to provide an aqueous acid leach solution containing nickel values along with other metal values including manganese values;
   (b) adding a hydroxide or hydroxide precursor to the aqueous acid leach solution to precipitate the nickel as nickel hydroxide;

(c) re-leaching the nickel hydroxide with an aqueous ammoniacal solution to provide an aqueous ammoniacal solution containing metal values including the nickel values;

(d) contacting the aqueous ammoniacal solution containing the nickel values and manganese values with a water insoluble oxime extractant, capable of extracting nickel from said aqueous ammoniacal solution, comprising an oxime extractant dissolved in a water-immiscible hydrocarbon solvent so as to provide an organic phase, for a time sufficient to extract the nickel values from said aqueous ammoniacal solution containing the nickel values thereby providing an aqueous phase of the ammoniacal solution from which nickel values have been removed and a water-immiscible organic phase containing the extracted nickel values and at least some of the manganese values;

(e) separating the aqueous and the water-immiscible organic phases;

(f) contacting the organic phase containing the nickel values and manganese values with an aqueous acid stripping solution thereby stripping the nickel values from the water-immiscible organic phase into the aqueous acid stripping solution;

(g) separating the aqueous acid stripping solution now containing the nickel values from the water-immiscible organic phase which contains manganese values;

(h) electrowinning the nickel from the aqueous acid stripping solution to remove and recover the nickel; and either before or after step (h), (i) mixing the water-immiscible organic phase which contains manganese values which were not removed by the aqueous acid stripping solution in step (f) with an active metal in finely divided form together with an aqueous solution of a strong acid to decrease or completely remove the manganese values from the water-immiscible organic phase, and (j) separating the resulting manganese depleted water-immiscible organic phase from the aqueous solution of a strong acid.

17. The process of claim 16 wherein in step (i) the finely divided active metal is finely divided zinc metal.

18. The process of claim 16 wherein in step (i) the finely divided active metal is selected from the group consisting of zinc, cobalt, iron, copper, and nickel metals.

19. The process of claim 16 wherein in step (i) the finely divided active metal has a particle size in the range of from about −325 mesh to about +100 mesh.

20. The process of claim 19 wherein the particle size is in the range of from about −325 mesh to about +400 mesh.

21. The process of claim 16 wherein in step (i) the strong acid is sulfuric acid.

22. The process of claim 16 wherein in step (i) the aqueous solution of a strong acid contains from about 50 to about 500 grams of acid per liter.

23. The process of claim 22 wherein the aqueous solution contains from about 150 to about 200 grams per liter of acid.

24. The process of claim 16 wherein step (i) is carried out at a temperature of from ambient to about 75° C.

25. The process of claim 24 wherein the temperature is from about 40 to about 60° C.

26. The process of claim 16 wherein in step (i) the quantity of active metal to manganese values in the water-immiscible hydrocarbon solution is from about 1 to about 25 grams of active metal per gram of manganese.

27. The process of claim 26 wherein the quantity of active metal to manganese values is from about 2 to about 15 grams of active metal per gram of manganese.

28. The process of claim 16 wherein in step (i) the volume/volume ratio of aqueous acid to hydrocarbon solution is from about (0.5 to 2.0):1.

29. The process of claim 16 wherein in step (i) the finely divided metal is finely divided zinc metal having a particle size of from about −325 mesh to about +100 mesh; the strong acid is sulfuric acid in a concentration of from about 50 to about 500 grams of acid per liter; and step i) is carried out at a temperature of from ambient to about 75° C.

30. The process of claim 29 wherein in step (i) the zinc metal has a particle size of from about −325 mesh to about +400 mesh; the concentration of the sulfuric acid is from about 150 to about 200 grams of acid per liter; and step i) is carried out at a temperature of from about 40 to about 60° C.

31. The process of claim 1 wherein step I) forms an emulsion which is filtered prior to step II).

32. The process of claim 16 wherein step (i) forms an emulsion which is filtered prior to step (j).

\* \* \* \* \*